United States Patent
Kim et al.

(10) Patent No.: US 10,659,157 B2
(45) Date of Patent: *May 19, 2020

(54) APPARATUS AND METHOD FOR REGISTERING VISIBLE LIGHT COMMUNICATION DEVICE AND COMBINING VISIBLE LIGHT COMMUNICATION SIGNAL AND WIRELESS COMMUNICATION SIGNAL

(71) Applicant: YUYANG DNU CO., LTD., Hwaseong-si, Gyeonggi-do (KR)

(72) Inventors: Sangok Kim, Seoul (KR); Byungoh Kim, Suwon-si (KR); Dongsik Kim, Siheung-si (KR); Sang-ho Yoon, Suwon-si (KR); Seung-wan Roh, Suwon-si (KR)

(73) Assignee: YUYANG DNU CO., LTD (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/355,067

(22) Filed: Mar. 15, 2019

(65) Prior Publication Data
US 2019/0253140 A1  Aug. 15, 2019

Related U.S. Application Data

(63) Continuation of application No. 15/939,767, filed on Mar. 29, 2018, now Pat. No. 10,277,318, which is a (Continued)

(30) Foreign Application Priority Data

| Sep. 30, 2015 | (KR) | 10-2015-0137526 |
| Sep. 1, 2016 | (KR) | 10-2016-0112431 |
| Sep. 6, 2016 | (KR) | 10-2016-0114371 |

(51) Int. Cl.
  *H04B 10/116*  (2013.01)
  *H04L 29/08*  (2006.01)
  (Continued)

(52) U.S. Cl.
  CPC ............ *H04B 10/116* (2013.01); *H04L 29/08* (2013.01); *H04W 4/33* (2018.02); *H04W 60/04* (2013.01);
  (Continued)

(58) Field of Classification Search
  CPC ...... H04B 10/116; H04W 4/33; H04W 60/04; H04W 4/70; H04W 4/025; H04W 4/80;
  (Continued)

(56) References Cited

U.S. PATENT DOCUMENTS

| 8,007,127 B2 | 8/2011 | Kim et al. |
| 9,859,979 B2 | 1/2018 | Choi |

(Continued)

FOREIGN PATENT DOCUMENTS

| JP | 2013509775 A | 3/2013 |
| JP | 2015012537 A | 1/2015 |

(Continued)

*Primary Examiner* — Leslie C Pascal
(74) *Attorney, Agent, or Firm* — Harness, Dickey & Pierce, P.L.C.

(57) ABSTRACT

Disclosed are a method and apparatus for registering visible light communication devices and combining a visible light communication signal and a wireless communication signal. It is an object of the present disclosure to provide a visible light communication device registration method in which a lighting device allows collective registration of the lighting device and a terminal as the terminal transmits data to a light using wireless communication.

11 Claims, 19 Drawing Sheets

Related U.S. Application Data continuation of application No. PCT/KR2016/010979, filed on Sep. 30, 2016.

(51) Int. Cl.

| | | |
|---|---|---|
| *H04W 4/33* | (2018.01) | |
| *H04W 60/04* | (2009.01) | |
| *H05B 37/02* | (2006.01) | |
| *H04W 4/02* | (2018.01) | |
| *H04W 4/70* | (2018.01) | |
| *H04W 4/80* | (2018.01) | |
| *H04L 29/06* | (2006.01) | |

(52) U.S. Cl.
CPC .......... *H05B 37/0245* (2013.01); *H04L 67/12* (2013.01); *H04L 67/42* (2013.01); *H04W 4/025* (2013.01); *H04W 4/70* (2018.02); *H04W 4/80* (2018.02)

(58) Field of Classification Search
CPC ..... H05B 37/0245; H04L 29/08; H04L 67/12; H04L 67/42
See application file for complete search history.

(56) References Cited

U.S. PATENT DOCUMENTS

| | | | |
|---|---|---|---|
| 10,277,318 B2 * | 4/2019 | Kim | ..................... H04B 10/116 |
| 2013/0163994 A1 | 6/2013 | Iizuka et al. | |
| 2015/0003832 A1 | 1/2015 | Yamasaki et al. | |

FOREIGN PATENT DOCUMENTS

| | | | |
|---|---|---|---|
| KR | 20090065815 A | 6/2009 | |
| KR | 20110037820 A | 4/2011 | |
| KR | 20120078659 A | 7/2012 | |
| KR | 20130101644 A | 9/2013 | |
| KR | 20150004226 A | 1/2015 | |
| KR | 101535005 B1 | 7/2015 | |
| WO | WO2011/051865 A1 | 5/2011 | |

\* cited by examiner

APPARATUS AND METHOD FOR REGISTERING VISIBLE LIGHT COMMUNICATION DEVICE AND COMBINING VISIBLE LIGHT COMMUNICATION SIGNAL AND WIRELESS COMMUNICATION SIGNAL

CROSS-REFERENCE TO RELATED APPLICATIONS

This application is a continuation of U.S. Ser. No. 15/939,767, filed on Mar. 29, 2018 which is a continuation of International Application No. PCT/KR2016/010979, filed Sep. 30, 2016, which claims priority under 35 U.S.C § 119(a) of Patent Application No. 10-2015-0137526, filed on Sep. 30, 2015 in Korea, Patent Application No. 10-2016-0112431, filed on Sep. 1, 2016 in Korea, and Patent Application No. 10-2016-0114371, filed on Sep. 6, 2016 in Korea. The entire disclosures of each of the above applications are incorporated herein by reference.

TECHNICAL FIELD

The present disclosure relates to a method and apparatus for registering visible light communication devices and combining a visible light communication signal and a wireless communication signal.

BACKGROUND

The statements in this section merely provide background information on the present disclosure and do not necessarily constitute the prior art.

Visible light communication is wireless communication technology for transmitting visible light data, which is configured in an on/off signal pattern, using the fast response speed of a lighting device. For visible light communication, when the lighting device is given a visible light communication function and installation position information about the lighting device is used, various communication supplementary services may be provided. For example, a communication supplementary service may be employed as a service for measuring the position of a terminal in a room, and may also be employed as a service for transmitting information from the lighting device to the terminal.

In order for visible light communication to provide various services as described above, communication devices used for visible light communication are required to be registered with a server. When a plurality of lighting devices is present, the lighting devices may be registered with the server, and the server may classify and deliver data to the respective lighting devices. Further, when visible light communication is used for a positioning service, the position of a terminal near the lighting device may be measured if the position of the lighting device has been registered. If the terminal has been registered with the server in advance, the server may determine whether the terminal requesting a specific service is a registered terminal to selectively provide the service.

According to the conventional visible light communication technology, the lighting device is capable of transmitting data to the terminal, but the terminal is not allowed to transmit data to the lighting device. Therefore, in registering the lighting device and the terminal with the server, the lighting device is required to be separately registered with the server, and the terminal is also required to be directly and separately registered with the server, which is inconvenient.

As the number of terminals receiving data from the lighting device increases, the procedure of registration with the server becomes complex.

There is a case where a specific service is provided and the lighting device needs to receive data from the terminal. Thus, a wireless communication module may be embedded in the lighting device. Then, the lighting device is enabled to transmit and receive data by wireless communication while operating as a light source. The lighting device receives attribute information about a light from the terminal or IoT (Internet of Things) devices using the wireless communication module. IoT devices refer to all smart devices and sensors for which IoT technology-based services are intended. The attribute information about the light is information on the brightness of the light, and conceptually includes luminosity, intensity of illumination, luminance, or dimming of the light. The lighting device may adjust the brightness of the light according to the attribute information about the light.

A lighting device may implement the visible light communication function using an intrinsic attribute of the light. However, the conventional lighting device is required to be equipped with both a visible light communication module and a wireless communication module to implement both wireless communication and visible light communication. As a result, the unit price of the lighting device is increased, and ports for outputting the visible light communication signal and the wireless communication signal, respectively, must be employed, which causes inconvenience.

In order to overcome such issues, a lighting device for processing a visible light communication signal and a wireless communication signal in a single module has been introduced. However, this lighting device selectively performs an operation of transmitting a visible light communication signal as a light source and an operation of transmitting a wireless communication signal. Receiving lighting attribute information from an IoT device in real time requires a module for processing the wireless communication signal to continuously operate, but the conventional lighting device cannot operate as a light source in this case.

SUMMARY

In accordance with some embodiments of the present disclosure, a lighting device of visible light, to be registered together with a terminal with a server, comprises a communication unit configured to communicate with the server and the terminal. The lighting device further comprises a controller configured to perform a control operation to modulate a terminal search signal into a visible light communication signal upon receiving a lighting search signal from the server via the communication unit, to transmit the visible light communication signal to the terminal and to transmit, upon receiving a terminal registration signal from the terminal via the communication unit, the terminal registration signal and a lighting registration signal to the server, wherein the terminal registration signal comprises an identifier of the terminal and the lighting registration signal comprises an identifier of the lighting device. The lighting device still further comprises a lighting part configured to modulate the terminal search signal into the visible light communication signal under control of the controller and transmit the visible light communication signal to the terminal.

In accordance with some embodiments of the present disclosure, a terminal device, to be registered with a lighting device, comprises a visible light receiver configured to receive, from the lighting device, a terminal search signal transmitted as a visible light communication signal, using a visible light receiving module. The terminal device further comprises a controller configured to control, when the visible light receiver demodulates the received visible light communication signal and recognizes reception of the terminal search signal, a terminal registration signal containing an identifier of the terminal to the lighting device. The terminal device still further comprises a communication unit configured to transmit the terminal registration signal to the lighting device under control of the controller.

In accordance with some embodiments of the present disclosure, a visible light communication server, for managing registration of a lighting device and a terminal, comprises a communication unit configured to transmit a lighting search signal to the lighting device and receive, from the lighting device, a lighting registration signal containing an identifier of at least one lighting device and a terminal registration signal containing an identifier of at least one terminal. The visible light communication server further comprises an identifier management unit configured to manage the identifiers of the respective lighting devices and the identifiers of the terminals received by the communication unit so as to be distinguished from each other and stored. The visible light communication server still further comprises a database configured to store the identifiers of the respective lighting devices and the identifiers of the terminals received by the communication unit under control of the identifier management unit.

BRIEF DESCRIPTION OF DRAWINGS

FIG. 16($b$) is a graph depicting a waveform of a signal radiated from a lighting device according to yet another embodiment of the present disclosure.

DETAILED DESCRIPTION

Figure 1:
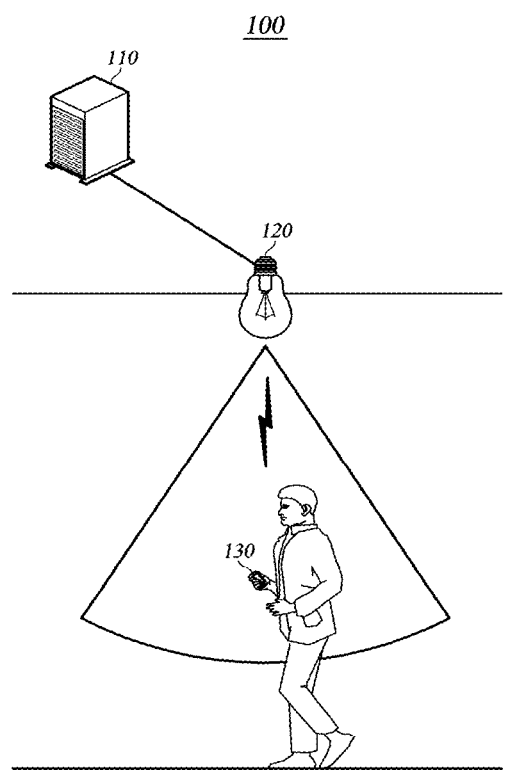
FIG. 1 is a diagram illustrating a visible light communication system according to an embodiment of the present disclosure.

Hereinafter, at least one embodiment of the present disclosure will be described in detail with reference to the accompanying drawings. In the following description, like reference numerals designate like elements, although the elements are shown in different drawings. Further, in the following description of the at least one embodiment, a detailed description of known functions and configurations incorporated herein will be omitted for the purpose of clarity and for brevity.

Additionally, various terms such as first, second, A, B, (a), (b), etc., are used solely for the purpose of differentiating one component from the other but not to imply or suggest the substances, the order or sequence of the components. Throughout this specification, when a part "includes" or "comprises" a component, the part is meant to further include other components, not excluding thereof unless there is a particular description contrary thereto. The terms such as "unit", "module", and the like refer to units for processing at least one function or operation, which may be implemented by hardware, software, or a combination thereof.

It is an object of the present disclosure to provide a visible light communication device registration method in which a lighting device allows collective registration of the lighting device and a terminal as the terminal transmits data to a light using wireless communication.

It is another object of the present disclosure to provide a method and apparatus for enabling a visible light communication service to be provided more efficiently by selectively transmitting an identifier of a lighting device in a visible light communication process such that a position registration procedure for the lighting device is automatically performed based on the identifier.

It is yet another object of the present disclosure to provide a method for combining a visible light communication signal and a wireless communication signal to allow a lighting device to perform visible light communication while performing wireless communication in real time.

It is yet another object of the present disclosure to provide a method for combining two signals having different speeds without causing flicker.

FIG. 1 is a diagram illustrating a visible light communication system according to an embodiment of the present disclosure.

The visible light communication system 100 includes a server 110, a lighting device 120, and a terminal 130.

The server 110 is a management device of the visible light communication system that is configured to receive and register an identifier from the lighting device 120 or the terminal 130 and determine whether to allow a visible light communication service depending on the registration.

The server 110 receives and registers the identifiers of the individual lighting devices 120 and the terminal 130 individually. The server 110 is connected to the lighting device 120 over a wired or wireless network. The wired network refers to communication technology for transmitting information to a remote place by a wired connection using radio waves. Examples of this technology include Ethernet communication, universal serial bus (USB), and wired communication using a wire, a twisted pair of wires, a coaxial cable, an optical link, or the like. The wireless network refers to a communication technology for transmitting information to a remote place using radio waves without connection by wire. Examples of this technology include Bluetooth, RFID (Radio Frequency Identification), IrDA (Infrared Data Association), UWB (Ultra-Wide Band), ZigBee, DLNA (Digital Living Network Alliance), WLAN (Wireless LAN), Wi-Fi, WiBro (Wireless broadband), WIMAX (World Interoperability for Microwave Access), HSDPA (High Speed Downlink Packet Access), LTE/LTE-A (Long Term Evolution/LTE-Advanced), and the like. The server 110 may distinguish the lighting device from the terminal using the identifiers.

There may be lighting devices connected to the server 110 over a wired or wireless network or attempting to connect but not yet registered with the server 110. To discover these lighting devices and guide registration thereof, the server 110 transmits a lighting search signal to the lighting devices connected thereto. The server 110 may transmit a lighting search signal when the number of unregistered lighting devices is greater than or equal to a preset reference value or may periodically transmit the lighting search signal regardless of the number of lighting devices. The server 110 registers and stores each lighting device by receiving a light registration signal containing an identifier of the lighting device from the lighting device.

The server 110 may receive, from the terminal 130, service information that the terminal desires to use. The service information refers to information about a visible light communication service that the terminal desires to use among various visible light communication services. Upon receiving the service information from the terminal 130, the server 110 assigns a service identifier corresponding to the service information. The service identifier is stored in the server 110 together with the identifier of the terminal.

The lighting device 120 serves to convert data received from the server 110 into a visible light communication signal and to transmit the converted signal to the terminal. The lighting device 120 generates a visible light communication signal by repeatedly turning on or off. The term "visible light communication" refers to a technique for transmitting information using light in the visible light wavelength range that is recognizable by the eyes. Since the lighting device 120 repeats turning on or off at a speed that the human optic nerve cannot recognize, it may transmit data while maintaining the function of lighting. The lighting device 120 may be implemented using a light emitting diode (LED), but is not limited thereto. Any device that emits visible light such as fluorescent light or visible light laser may be used.

The lighting device 120 includes a wired or wireless communication module. The lighting device 120 uses a wired or wireless communication method for the server 110 and uses a wireless communication method for the terminal 130.

The lighting device 120 transmits data to the terminal using a visible light communication method. The lighting device 120 may receive a lighting search signal from the server 110. Upon receiving the lighting search signal, the lighting device 120 may transmit an identifier thereof directly to the server 110. However, embodiments are not necessarily limited thereto, and the following operation may be performed. When the lighting device 120 receives the lighting search signal from the server 110, it transmits a terminal search signal to check whether there is a terminal that is not registered with the server 110. In transmitting the terminal search signal to a terminal, the lighting device 120 does not specify a terminal, but allows all terminals in the area reached by the visible light of the lighting device 120 to receive the signal. Although FIG. 1 illustrates that there is only one terminal 130, a plurality of terminals 130 is common.

The lighting device 120 receives a terminal registration signal from the terminal 130. The lighting device 120 receives, from the server 110, a terminal identifier registered with the server 110 in advance and a correspondingly stored service identifier, and stores the received identifiers. The lighting device 120 compares the terminal identifier received from the terminal with a pre-stored terminal identifier and determines whether to transmit the service identifier to the server 110 depending on the result of comparison. A detailed description will be given with reference to FIG. 6 or 7.

The terminal 130 is a device configured to receive a visible light communication signal from the lighting device 120, demodulate the received visible light communication signal to extract data and transmit the data to the lighting device 120 using the wireless communication method. The terminal 130 may be implemented as an Internet of Things (IOT) device including a light receiving sensor as well as a smart device such as a smartphone or a tablet PC, a notebook, a laptop, and a personal digital assistant (PDA). The terminal 130 receives the visible light communication signal from the lighting device 120 and converts the same into an electrical signal. The lighting device includes a built-in or external visible light receiving module. The visible light receiving module may be implemented as a camera, a photodiode, or the like, but is not limited thereto. Any module capable of receiving visible light is acceptable.

The terminal 130 receives a terminal search signal from the lighting device 120 and transmits a terminal registration signal including the terminal identifier to the lighting device 120.

The terminal 130 may transmit the terminal identifier and the service information to be used to the server 110 upon or before transmitting the terminal registration signal.

A lighting device identifier or a terminal identifier refers to information by which the lighting device or terminal may be identified. A unique production number or the like assigned at the time of production of the lighting device or the terminal may be used as an identifier. Unique identification information such as, for example, a MAC address, may be used as an identifier on the network that the lighting device or the terminal uses. The above-described information is merely an example of an identifier, and any information by which the lighting device or each terminal may be identified may be used as an identifier.

Figure 2:
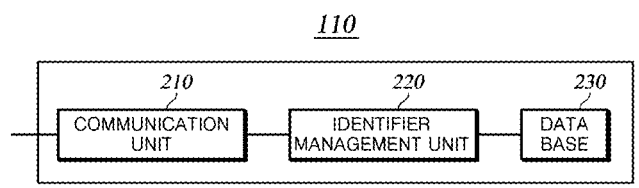
FIG. 2 is a block diagram of a server according to an embodiment of the present disclosure.

FIG. 2 is a block diagram of a server according to an embodiment of the present disclosure.

The server 110 includes a communication unit 210, an identifier management unit 220, and a database 230.

The communication unit 210 transmits the lighting search signal to the lighting device 120. In transmitting the lighting search signal to the lighting device 120, the communication unit 210 may transmit the terminal identifier or the service identifier received from the terminal 130 as well.

The communication unit 210 receives a light registration signal including the lighting device identifier and a terminal registration signal including the terminal identifier from the lighting device 120. The communication unit 210 may be implemented as a wired or wireless communication module depending on the type of connection with the lighting device 120 and the terminal 130. The communication unit 210 may receive a service identifier together with the light registration signal and the terminal registration signal.

Before transmitting the lighting search signal to the lighting device 120, the communication unit 210 may receive the terminal identifier and the service information from the terminal 130.

The identifier management unit 220 receives the lighting device identifier or the terminal identifier from the communication unit 210, and manages the identifiers so as to be distinguished from each other and stored in the database 230. While FIG. 1 illustrates that there is one lighting device 120 and one terminal 130, there may be a plurality of lighting devices 120 and a plurality of terminals 130. Since the lighting device identifier and the terminal identifier may be simultaneously or sequentially received from the respective lighting devices and terminals, the identifier management unit 220 distinguishes each of the identifiers and stores the same in the database 230.

When the identifier management unit 220 receives the terminal identifier and the service information from the communication unit 210, it assigns a service identifier corresponding to the service information. After assigning the service identifier, the identifier management unit 220 stores the same together with the terminal identifier in the database 230. By storing the service identifier and the terminal identifier together, the server 110 may determine whether a specific terminal can use a specific service. For example, suppose that a visible light positioning service identifier is matched with terminal A and stored. Upon receiving the identifier of terminal A, the server 110 may determine terminal A as a terminal that can use the visible light positioning service. On the other hand, when the server 110 receives a terminal identifier of a terminal other than terminal A, the server 110 may determine the terminal as a terminal that cannot use the visible light positioning service.

Under control of the identifier management unit 220, the database 230 stores the identifiers of the lighting devices or terminals received by the communication unit 210. When the identifier management unit 220 assigns service identifiers according to the terminal identifiers, the database 230 may store the service identifiers by matching the same with the terminal identifiers.

Figure 3:
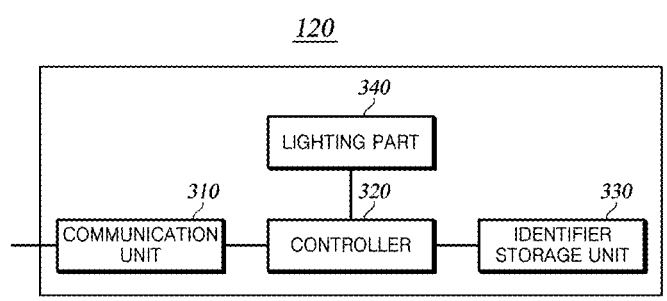
FIG. 3 is a block diagram of a lighting device according to an embodiment of the present disclosure.

FIG. 3 is a block diagram of a lighting device according to an embodiment of the present disclosure.

The lighting device 120 includes a communication unit 310, a controller 320, an identifier storage unit 330, and a lighting part 340.

The communication unit 310 receives a lighting search signal from the server 110. The communication unit 310 may be connected to the server 110 using a wired/wireless communication module and receive the lighting search signal from the server 110. The communication unit 310 may receive a terminal identifier and a service identifier pre-registered with the server 110, together with the lighting search signal.

The communication unit 310 receives a terminal registration signal including a terminal identifier from the terminal 130. The communication unit 310 is connected to the terminal 130 using the wireless communication module and receives the terminal registration signal from the terminal 130. After receiving the terminal registration signal from the terminal 130, the communication unit 310 transmits the lighting registration signal including the lighting device identifier and the terminal registration signal to the server 110. In some cases, the communication unit 310 may transmit the service identifier received from the terminal together with the lighting registration signal and the terminal registration signal.

When the lighting search signal is received from the server 110, the controller 320 controls the lighting part 340 to transmit a terminal search signal using the visible light communication signal. When the communication unit 310 receives the lighting search signal, the controller 320 generates a visible light communication signal by modulating the terminal search signal for searching for a terminal through pulse modulation, frequency shift keying (FSK), phase shift keying (PSK), on-off keying (OOK), or the like. Pulse modulation is a technique of sampling a waveform at discrete time intervals and performing modulation by changing the amplitude, phase (position), width or the like of a pulse train generated according to the sampling. Pulse modulation is divided into pulse amplitude modulation (PAM), pulse width modulation (PWM), and pulse position modulation (PPM). FSK and PSK are methods of transmitting digital information by using changes in discrete frequency and phase of a carrier wave. OOK is a modulation method of displaying digital data depending on presence or absence of a carrier wave. OOK is a method of displaying binary value 1 when there is a carrier transmitted at a specific time, and displaying binary value 0 when there is no carrier transmitted at the specific time. The controller 320 controls the lighting part 340 to transmit the generated terminal search signal on the visible light communication signal. When the terminal identifier and the service identifier pre-registered with the server 110 are received together with the lighting search signal, the controller 320 stores the pre-registered terminal identifier and service identifier in the identifier storage unit 330.

In controlling transmission of the terminal search signal, the controller 320 may add information for adjusting the transmission timing of the terminal registration signal to the terminal search signal according to the terminal identifier. For example, suppose that the terminal identifier is implemented as a number. When the last digit of the terminal identifier is between 1 and 5, the controller 320 may add control information causing the terminal to transmit a terminal registration signal as soon as the terminal receives the terminal search signal. On the other hand, when the last digit is between 6 and 9, the controller 320 may add control information causing the terminal to transmit the terminal registration signal a predetermined time after receiving the terminal search signal. In this way, by adjusting the transmission timing of the terminal registration signal according to the terminal identifier, the controller 320 may prevent the lighting device 120 from being overloaded when the number of terminals transmitting terminal registration signals to the lighting device 120 increases.

When a terminal registration signal is received from the terminal 130, the controller 320 analyzes the terminal identifier included in the terminal registration signal. The controller 320 compares the terminal identifier received from the terminal 130 with a pre-registered terminal identifier stored in the identifier storage unit 330 and determines whether or not the terminal identifiers coincide with each other. If the two terminal identifiers do not coincide with each other, the controller 320 may recognize that the terminal 130 is not a terminal desiring to use a specific visible light communication service. If the two terminal identifiers coincide with each other, the controller 320 determines whether a service identifier corresponding to the terminal identifier is present in the identifier storage unit 330. If the service identifier is present in the identifier storage unit 330, the controller 320 may recognize that the terminal 130 is a terminal desiring to use the specific visible light communication service.

The controller 320 determines whether to transmit the service identifier depending on the result of the analysis. When the controller 320 recognizes that the terminal 130 is not a terminal desiring to use the specific visible light communication service, the controller controls the communication unit 310 to transmit only the lighting registration signal including the identifier of the lighting device 120 and the terminal registration signal including the terminal identifier to the server 110. Upon receiving the lighting registration signal and the terminal registration signal, the server 110 may recognize that the terminal is not a terminal desiring to use the specific visible light communication service, and may limit the specific visible light communication service for the terminal. On the other hand, when the controller 320 recognizes that the terminal 130 is a terminal desiring to use the specific visible light communication service, the controller 320 controls the communication unit 310 to transmit a service identifier together with the lighting registration signal and the terminal registration signal to the server 110. Since the server 110 receives the service identifier together with the lighting registration signal and the terminal registration signal, it may allow the terminal to use the specific visible light communication service.

The identifier storage unit 330 stores the pre-registered terminal identifier and service identifier received together with the lighting search signal.

The lighting part 340 transmits the terminal search signal using a visible light communication signal under control of the controller 320. The lighting part 340 does not specify a terminal in transmitting the terminal search signal, but transmits the terminal search signal to all terminals within the range of the visible light communication signal of the lighting part 340.

Figure 4:
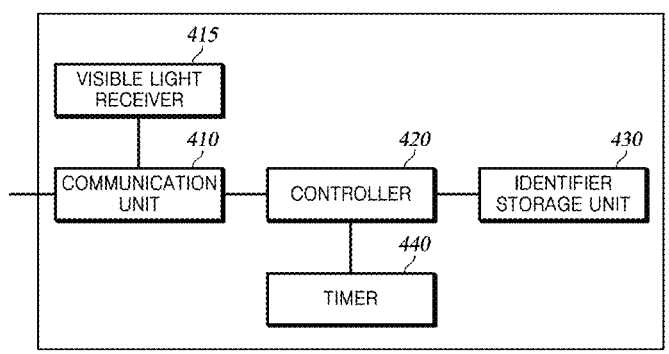
FIG. 4 is a block diagram of a terminal according to an embodiment of the present disclosure.

FIG. 4 is a block diagram of a terminal according to an embodiment of the present disclosure.

The terminal 130 includes a communication unit 410, a visible light receiver 415, a controller 420, an identifier storage unit 430, and a timer 440.

The communication unit 410 may directly transmit a terminal identifier and service information to the server 110. The communication unit 410 may include a wireless communication module and may transmit the service information together with the terminal identifier to the server 110.

The communication unit 410 receives a service identifier from the server 110. The received service identifier is stored in the identifier storage unit 430.

The communication unit 410 transmits a terminal registration signal including the terminal identifier and a service identifier to the lighting device 120 according to the result of determination of the controller 420.

The visible light receiver 415 receives the terminal search signal and the service identifier from the lighting device 120. The visible light receiver 415 may receive the terminal search signal transmitted over the visible light communication signal using the visible light receiving module. After receiving the visible light communication signal, the visible light receiver 415 converts the same into an electrical signal.

At this time, control information for adjusting the transmission timing of the terminal registration signal may be included in the terminal search signal.

The controller 420 determines whether the service identifier received from the server 110 and stored in the identifier storage unit 430 coincides with the service identifier received from the lighting device 120. The controller 420 demodulates the electrical signal obtained through conversion in the visible light receiver 415, using the same technique as the modulation method performed by the lighting device 120. By performing demodulation, the controller 420 recognizes that the terminal search signal has been received from the lighting device 120. In order to determine whether the service requested by the controller 420 coincides with the service that the lighting device 120 intends to check, the controller 420 determines whether the identifiers of both services coincide with each other.

The controller 420 transmits a terminal registration signal or the terminal registration signal and a service identifier depending on the result of the determination. If the service identifier stored in the identifier storage unit 430 does not coincide with the service identifier received from the lighting device 120, the controller 420 transmits a terminal registration signal including the terminal identifier to the lighting device 120. On the other hand, if the service identifiers coincide with each other, the controller 420 transmits the service identifier together with the terminal identifier to the lighting device 120. If the two service identifiers coincide with each other, the controller 420 controls the terminal 130 to transmit, to the lighting device 120, the service identifier together with the terminal registration signal including the terminal identifier in order to announce that the terminal 130 is a terminal that can use the corresponding service. When control information for adjusting the transmission timing of the terminal registration signal is included in the terminal search signal, the controller 420 adjusts the terminal registration signal transmission timing of the communication unit 410 according to the control information.

The identifier storage unit 430 stores the service identifier received from the server 110.

The timer 440 checks the timing to transmit the terminal registration signal according to the control information for adjusting the transmission timing of the terminal registration signal.

Figure 5:
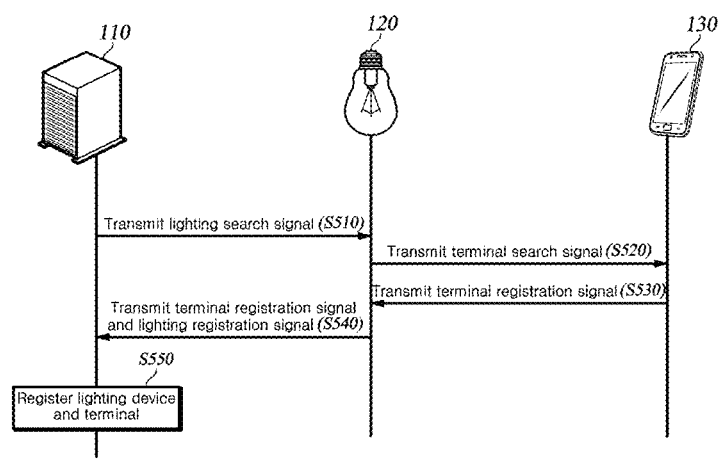
FIG. 5 is a timing chart illustrating a process of registering a visible light communication device with a server according to an embodiment of the present disclosure.

FIG. 5 is a timing chart illustrating a process of registering a visible light communication device with a server according to an embodiment of the present disclosure.

The server 110 transmits a lighting search signal to the lighting device 120 (S510). The server 110 may transmit, to the lighting device 120, the lighting search signal including control information for adjusting the transmission timing of the terminal registration signal.

Upon receiving the lighting search signal from the server 110, the lighting device 120 transmits a terminal search signal to the terminal 130 (S520). The lighting device 120 modulates the terminal search signal into a visible light communication signal through pulse modulation, shift keying, or OOK and transmits the visible light communication signal. The lighting device 120 omnidirectionally transmits the lighting search signal to all the terminals within the range of the visible light communication signal.

Upon receiving the terminal search signal, the terminal 130 transmits a terminal registration signal to the lighting device 120 (S530). When the terminal search signal is received using the visible light receiver, the terminal 130 converts the visible light communication signal into an electrical signal and demodulates the electrical signal using the same technique as the modulation method used by the lighting device 120. By performing demodulation, the controller 420 recognizes that the terminal search signal has been received from the lighting device 120. After recognizing receipt of the terminal search signal, the terminal 130 transmits a terminal registration signal including the terminal identifier to the lighting device 120. The terminal 130 transmits the terminal registration signal including the terminal identifier to the lighting device 120 using wireless communication.

Upon receiving the terminal registration signal, the lighting device 120 transmits the terminal registration signal and the lighting registration signal to the server 110 (S540). The lighting device 120 transmits, to the server 110, a lighting registration signal including the identifier thereof together with the terminal registration signal received from the terminal 130.

The server 110 registers the lighting device 120 and the terminal 130 (S550). While the lighting device 120 is illustrated in FIG. 5 as receiving a terminal registration signal from one terminal, it may receive terminal registration signals from a plurality of terminals. As the lighting device 120 transmits, to the server 110, the identifier thereof and all the received identifiers of a plurality of terminals connected thereto through visible light communication, the server 110 may simultaneously receive and register the identifiers from the lighting device 120 without receiving the lighting device identifier and terminal identifiers individually from the lighting device 120 and the plurality of terminals and receiving corresponding registration requests.

Figure 6:
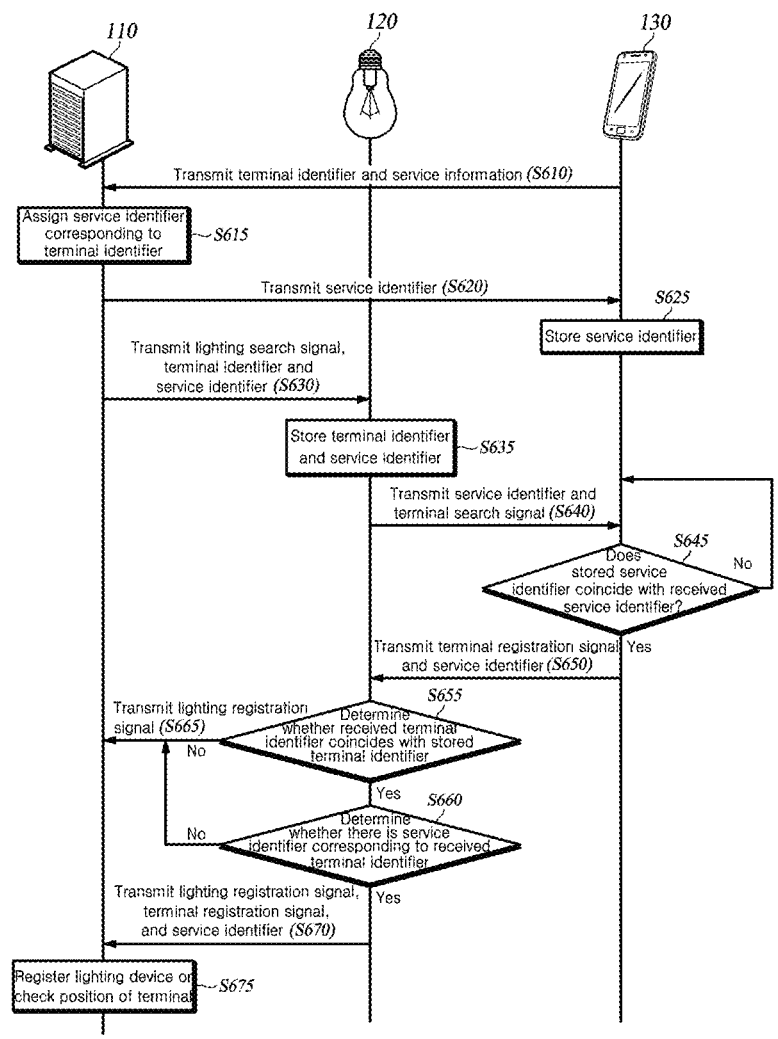
FIG. 6 is a timing chart illustrating a process of registering a visible light communication device with a server according to an embodiment of the present disclosure.

FIG. 6 is a timing chart illustrating a process of registering a visible light communication device with a server according to an embodiment of the present disclosure.

The terminal 130 directly transmits the terminal identifier and service information to the server 110 (S610). The terminal 130 transmits the terminal identifier and service information in advance before registering with the server 110.

The server 110 assigns a service identifier and stores the same together with the terminal identifier (S615). Upon receiving the service information together with the terminal identifier from the terminal 130, the server 110 assigns a unique service identifier corresponding to the service information. The server 110 may register the terminal as a terminal that can use a specific service in advance.

The server 110 transmits the service identifier to the terminal 130 (S620).

The terminal 130 stores the received service identifier (S625).

The server 110 transmits the lighting search signal, the terminal identifier, and the service identifier to the lighting device 120 (S630). In transmitting the lighting search signal, the server 110 may add, to the lighting search signal, control information for adjusting the transmission timing of a terminal registration signal.

The lighting device 120 stores the terminal identifier and the service identifier (S635).

The lighting device 120 transmits the terminal search signal and the service identifier to the terminal 130 (S640). When the lighting device 120 receives a lighting search signal and a service identifier from the server 110, the lighting device 120 modulates the terminal search signal and the service identifier into a visible light communication signal using pulse modulation, shift keying, or OOK and transmits the visible light communication signal. The lighting device 120 may transmit, to the terminal 130, the terminal search signal including control information for adjusting the transmission timing of the terminal registration signal.

The terminal 130 determines whether the received service identifier coincides with the stored service identifier (S645). By determining whether the service identifiers coincide with each other, the terminal 130 determines whether the service for which a request has been made to the server 110 coincides with the service that the lighting device 120 intends to check.

If both service identifiers coincide with each other, the terminal 130 transmits the terminal registration signal and the service identifier to the lighting device 120 (S650). By transmitting the service identifier together with the terminal registration signal including the terminal identifier, the terminal 130 indirectly informs the server 110 that the service requested by the terminal coincides with the service that the lighting device 120 intends to check.

The lighting device 120 determines whether the terminal identifier received from the terminal 130 coincides with the stored terminal identifier (S655). If the two terminal identifiers do not coincide with each other, the lighting device 120 may recognize that the terminal 130 is not a terminal desiring to use a specific visible light communication service.

If the two terminal identifiers coincide with each other, the lighting device 120 determines whether a service identifier corresponding to the received terminal identifier is present (S660). If the two terminal identifiers coincide with each other, the lighting device 120 determines once again whether there is a service identifier corresponding to the received terminal identifier among the stored service identifiers. If there is a coincident service identifier, the lighting device 120 may recognize that the terminal 130 is a terminal desiring to use the specific visible light communication service.

If the two terminal identifiers do not coincide with each other or there is no service identifier corresponding to the received terminal identifier, the lighting device 120 transmits a lighting registration signal to the server (S665). As the server 110 receives the lighting registration signal alone, it may recognize that the terminal is not a terminal to use a specific visible light communication service, and limit specific visible light communication services for the terminal.

If the two terminal identifiers do coincide with each other and there is a service identifier corresponding to the received terminal identifier, the lighting device 120 transmits a lighting registration signal, a terminal registration signal, and the service identifier (S670).

The server 110 registers the lighting device 120, or checks the position of the terminal 130, registering the lighting device 120 (S675). If the lighting registration signal is received alone in operation S665, the server 110 registers the lighting device 120. Upon receiving the lighting registration signal, the terminal registration signal, and the service identifier in operation S670, the server 110 registers the lighting device and checks the terminal identifier and the service identifier included in the terminal registration signal. Since the terminal identifier is a pre-registered terminal identifier, the server 110 does not perform separate registration, but determine the current position of a lighting device positioned near a specific terminal that can use a specific service.

Figure 7:
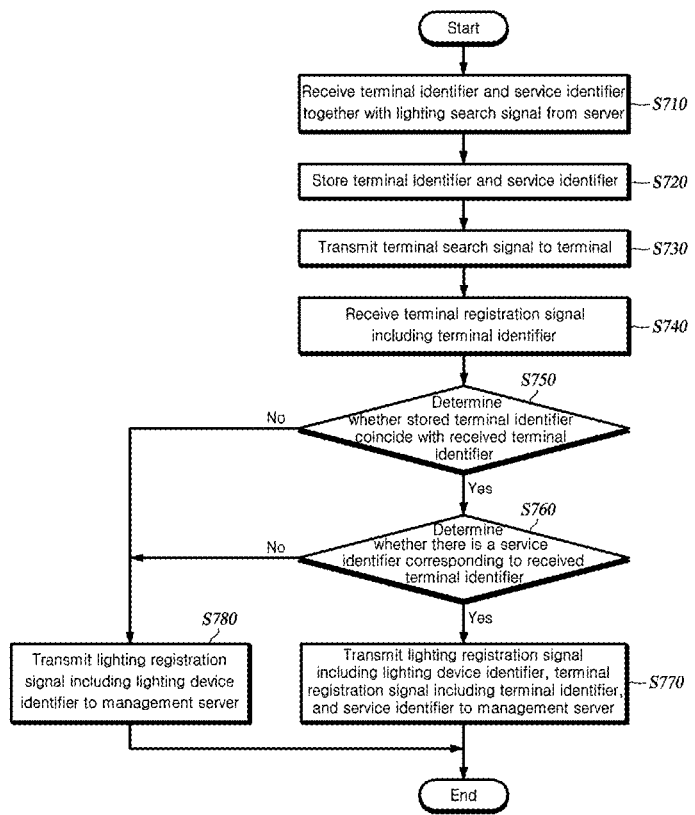
FIG. 7 is a flowchart illustrating an operation of a lighting device according to an embodiment of the present disclosure.

FIG. 7 is a flowchart illustrating an operation of a lighting device according to an embodiment of the present disclosure.

The terminal identifier and the service identifier are received from the server 110 together with the lighting search signal (S710). The lighting device 120 receives the terminal identifier and the service identifier together with the lighting search signal from the server 110 using a wired or wireless communication module.

The terminal identifier and the service identifier are stored (S720).

A terminal search signal is transmitted to the terminal 130 (S730). The lighting device 120 transmits the terminal search signal using a visible light communication signal. Upon receiving the lighting search signal and the service identifier from the server 110, the lighting device 120 modulates the terminal search signal into a visible light communication signal through pulse modulation, shift keying, or OOK, and transmits the visible light communication signal. The lighting device 120 does not specify a terminal in transmitting the terminal search signal, but transmits the terminal search signal to all terminals within the range of the visible light communication signal of the lighting device 120.

A terminal registration signal including the terminal identifier is received (S740).

It is determined whether the stored terminal identifier coincides with the received terminal identifier (S750). If the two terminal identifiers do not coincide with each other, the lighting device 120 may recognize that the terminal 130 is not a terminal desiring to use a specific visible light communication service.

If the two terminal identifiers coincide with each other, it is determined whether there is a service identifier corresponding to the received terminal identifier among the stored service identifiers (S760). If the two identifiers coincide with each other and there is a service identifier corresponding to the received terminal identifier, the lighting device 120 may recognize that the terminal 130 is a terminal desiring to use the specific visible light communication service.

If the two identifiers coincide with each other and there is a service identifier corresponding to the terminal identifier received from the terminal 130, a lighting registration signal including the identifier of the lighting device 120, a terminal registration signal including the terminal identifier, and the service identifier are transmitted to the server 110 (S770).

If the two identifiers do not coincide with each other or there is no service identifier corresponding to the terminal identifier received from the terminal 130, a lighting registration signal including the identifier of the lighting device 120 is transmitted to the server 110 (S780).

Figure 8:
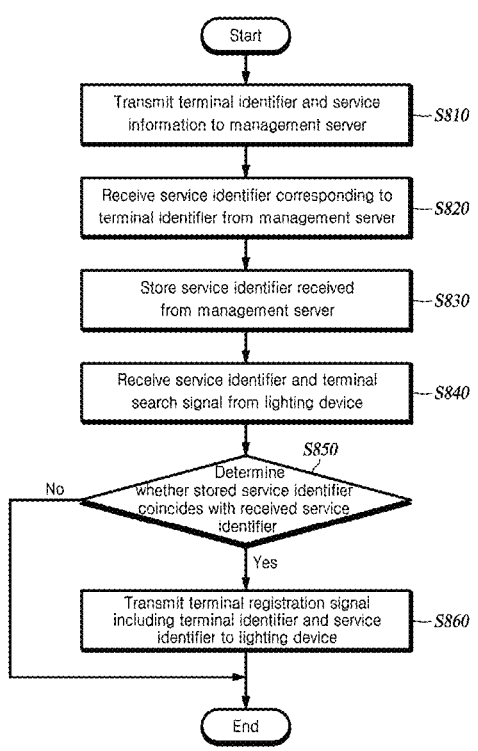
FIG. 8 is a flowchart illustrating an operation of a terminal according to an embodiment of the present disclosure.

FIG. 8 is a flowchart illustrating an operation of a terminal according to an embodiment of the present disclosure.

The terminal identifier and service information are transmitted to the server 110 (S810). The communication unit 440 may transmit the terminal identifier and the service information to the server 110 using wireless communication.

The service identifier corresponding to the terminal identifier is received from the server 110 (S820).

The service identifier received from the server 110 is stored (S830).

The service identifier and the terminal search signal are received from the lighting device 120 (S840). The terminal 130 may include a visible light receiving module and receives a service identifier and a terminal search signal from the lighting device 120 using a visible light communication signal. Upon receiving the terminal search signal from the lighting device 120, the terminal 130 demodulates the terminal search signal using the same technique as the method of modulation performed by the lighting device 120.

By performing the demodulation, the controller 420 recognizes that the terminal search signal has been received from the lighting device 120.

It is determined whether the stored service identifier coincides with the received service identifier (S850). The terminal 130 determines whether the service requested by the terminal coincides with the service that the lighting device 120 intends to check by determining whether the two service identifiers coincide with each other.

If the two service identifiers coincide with each other, a terminal registration signal including the terminal identifier and the service identifier are transmitted to the lighting device 120 (S860).

Figure 9:
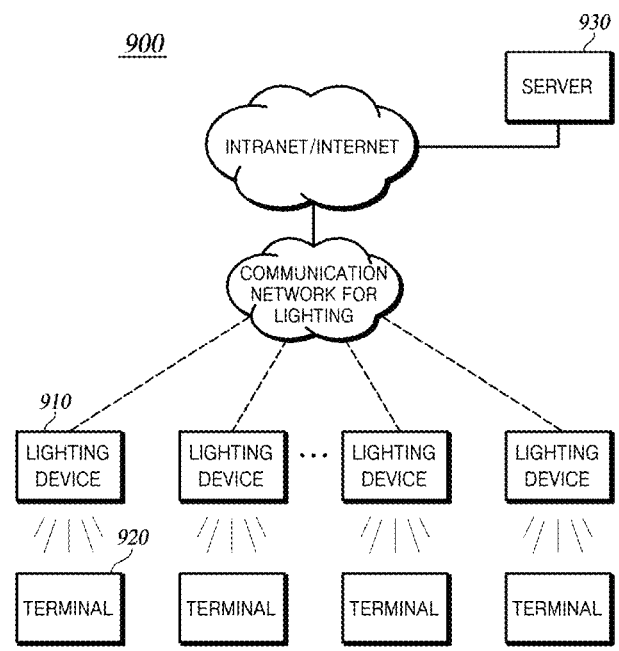
FIG. 9 is a diagram illustrating a visible light communication system according to another embodiment of the present disclosure.

FIG. 9 is a diagram illustrating a visible light communication system according to another embodiment of the present disclosure.

The visible light communication system 900 includes a lighting device 910, a terminal 920, and a server 930.

The lighting device 910 is a device that transmits data to the terminal 920 over light in the visible light wavelength region. When the terminal 920 is recognized in a visible light communication area, the lighting device 910 transmits an optical signal including data to the terminal 920 based on visible light communication. A plurality of lighting devices 910 is preferably provided in a preset lighting area, but embodiments are not limited thereto.

The lighting device 910 may include a communication module and may form a network together with other lighting devices, the server 930 and the terminal 920 in the preset lighting area using the communication module provided thereto. The lighting device 910 may be operatively connected with other lighting devices, the server 930 and the terminal 920 using the network, and may receive visible light communication data from the server 930. The network may be a wired or wireless network. The wired network refers to a communication technology for transmitting information to a remote place by a wired connection using radio waves, and the wireless network refers to a communication technology for transmitting information to a remote place using radio waves without connection by wires. The visible light communication data may include various kinds of information such as multimedia information, such as voice, images and videos, and control information for controlling the lighting device 910.

The lighting device 910 may selectively transmit the lighting device identifier to the terminal 920 together with the visible light communication data in the process of visible light communication with the terminal 920. The lighting device 910 may use the unique identification information about the wireless communication module provided in the lighting device 910 as the lighting device identifier. When the communication module is a wireless communication module, the communication module has a unique hardware address. For example, when the communication module is a ZigBee wireless communication module, the communication module has a unique address having a length of 8 bytes. Considering this point, the communication module may use a unique hardware address as the lighting device identifier.

The lighting device 910 selectively transmits the lighting device identifier to the terminal 920 together with the visible light communication data depending on whether the position of the lighting device 910 is registered with the server 930. The lighting device identifier is used as a basis of the terminal 920 determining whether to perform the position registration procedure for the lighting device 910. The lighting device identifier is used as a basis of distinguishing the lighting device 910 from other lighting devices in the process of registering the position information about the lighting device 910.

The lighting device 910 may receive position information from the terminal 920 and transmit the same to the server 930.

The terminal 920 is a device for providing a visible light communication service to a user located in a preset lighting area by utilizing visible light communication.

The terminal 920 receives an optical signal from the lighting device 910 installed in the preset lighting area, and extracts visible light communication data from the optical signal.

The terminal 920 selectively calculates and provides the position information about the lighting device 910 based on the related information about the lighting device 910 included in the visible light communication data. The terminal 920 determines whether or not the position of the lighting device 910 is registered based on the related information about the lighting device 910, and performs the procedure of registering the position of the lighting device 910 according to the result of determination. Here, the related information about the lighting device 910 may contain only the lighting device identifier or may contain the lighting device identifier and information about whether or not the lighting device 910 is registered. A method for the terminal 920 to determine whether or not the position of the lighting device 910 is registered based on the related information about the lighting device 910 will be described in detail with reference to FIG. 11.

Hereinafter, a method for the terminal 920 to perform a procedure of registering the position of the lighting device 910 will be described.

The terminal 920 calculates information of current position at which the terminal is located. In this operation, the terminal 920 calculates the current position information about the terminal 920 using a part or the entirety of the GPS sensor and the motion sensor provided in the terminal 920.

The terminal 920 generates matching information by matching the lighting device identifier included in the related information about the lighting device 910 and the pre-calculated current position information about the terminal 920. Then, the terminal 920 provides the matching information as the position information about the lighting device 910 to the lighting device 910 or the server 930.

In the case of configuring a lighting control system, the conventional visible light communication system causes inconvenience in the configuration phase as it requires the installation position of the visible light lighting device in the visible light communication system to be directly checked on site or requires the installation position of the lighting device to be checked by intentionally performing the on/off operation of the visible light lighting device after installation. According to this embodiment, even if the user simply carries the terminal 920 in a certain pattern within a preset lighting area, the server 930 may easily acquire the position information about the lighting device 910 included in the visible light communication system.

The server 930 performs control and monitoring operations on the lighting device 910 provided in the visible light communication system 900. The server 930 updates the visible light communication data in the lighting device 910 using a network formed between the server 930 and the lighting device 910.

In transmitting the visible light communication data to the lighting device 910, the server 930 may transmit the related information about the lighting device 910 currently in operative connection with the server 930 along with the visible light communication data. Thus, the lighting device 910 and the terminal 920 may selectively perform the procedure of registering the position of the lighting device 910.

When the server 930 receives the position information about the lighting device 910 from the lighting device 910 or the terminal 920, it registers the same as related information about the lighting device 910. Thereafter, the server 930 performs control and monitoring of the lighting device 910 based on the related information about the lighting device 910.

Figure 10:
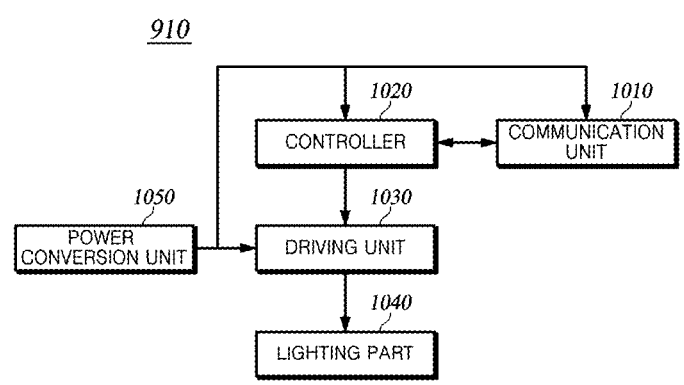
FIG. 10 is a block diagram of a lighting device according to another embodiment of the present disclosure.

FIG. 10 is a block diagram of a lighting device according to another embodiment of the present disclosure.

The lighting device 910 includes a communication unit 1010, a controller 1020, a driving unit 1030, a lighting part 1040, and a power conversion unit 1050.

The communication unit 1010 includes a communication module and receives visible light communication data from the terminal 920 or the server 930 using the communication module. The communication unit 1010 receives the visible light communication data from the server 930. The visible light communication data includes information about registration of the lighting device 910 in the server 930. The communication unit 1010 may receive matching information obtained by matching the current position information about the terminal 920 with the information about the lighting device.

The communication unit 1010 may receive the matching information from the terminal 920 and transmit the same to the server 930.

The controller 1020 generates a lighting control signal based on the visible light communication data so as to generate a visible light signal corresponding to the received visible light communication data.

The controller 1020 checks if the position of the lighting device 910 is registered in the server 930, and generates a lighting control signal based on the lighting device identifier and the visible light communication data according to the result of the checking. In this operation, the controller 1020 checks if the position of the lighting device 910 is registered in the server 930 based on the registration information about the lighting device 910 included in the visible light communication data. If it is determined as a result of the checking that a position registration procedure for the lighting device 910 is needed, the controller 1020 performs a control operation to transmit the visible light communication data including the lighting device identifier to the terminal 920.

Information about whether or not the lighting type information corresponding to the lighting device 910 is registered may be further included in the registration information about the lighting device 910. The lighting type information includes information at least one of the brightness and color of the lighting unit. In this case, the controller 1020 checks whether or not the lighting type information corresponding to the lighting device 910 is registered in the server 930 based on the registration information about the lighting device 910, and generate a lighting control signal, additionally considering the lighting type information according to the result of the checking.

The driving unit 1030 turns the lighting unit included in the lighting part 1040 on or off based on the generated lighting control signal. The driving unit 1030 may include a switching device for turning the lighting unit included in the lighting part 1040 on or off.

The lighting part 1040 includes a lighting unit composed of at least one light emitting element. Here, the light emitting element is preferably a light emitting diode (LED), but is not limited thereto. For example, the light emitting element may be implemented as an organic light emitting diode (OLED) or a plasma light system (PLS). The lighting unit is turned on or off by the driving unit 1030 to generate a visible light signal corresponding to the visible light communication data. The method of generating a visible light signal in accordance with the on or off operation of the lighting unit is a typical technique in the field of visible light communication, and a detailed description thereof will be omitted.

The power conversion interval 1050 provides necessary power for driving the lighting device 910. For example, the power conversion unit 1050 supplies DC power needed to drive the lighting unit in the lighting part 1040.

Figure 11:
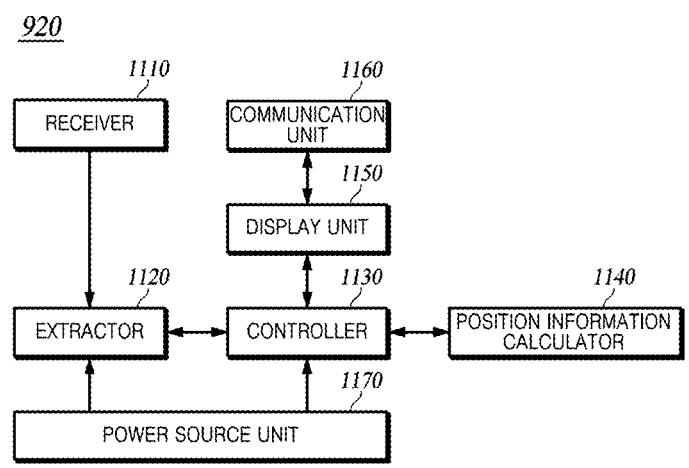
FIG. 11 is a block diagram of a terminal according to another embodiment of the present disclosure.

FIG. 11 is a block diagram of a terminal according to another embodiment of the present disclosure.

The terminal 920 includes a receiver 1110, an extractor 1120, a controller 1130, a position information calculator 1140, a display unit 1150, a communication unit 1160, and a power source unit 1170.

The receiver 1110 receives visible light signals from at least one lighting device 910 in a preset lighting area. The receiver 1110 includes an optical sensor such as a lens and a photodiode, and receives a visible light signal from the lighting device 910 using the optical sensor.

The extractor 1120 extracts visible light communication data from the received visible light signal. The extractor 1120 converts received analog information into digital data (ADC), and restores the visible light communication data transmitted by the lighting device 910 by decoding the converted digital data.

The controller 1130 selectively calculates position information about the lighting device 910 based on the restored visible light communication data. The controller 1130 checks whether or not the position of the lighting device 910 is registered in the server 930 based on the related information about the lighting device 910 included in the visible light communication data, and selectively calculates the position information about the lighting device 910 depending on the result of the checking. The lighting device 910 may selectively transmit the lighting device identifier to the terminal 920 together with the visible light communication data depending on whether the position of the lighting device 910 is registered in the server 930. In this case, the controller 1130 checks whether unique identification information corresponding to the lighting device 910 is included in the related information about the lighting device 910, and performs a procedure of registering the position of the lighting device 910 depending on the result of the checking.

In another embodiment, the lighting device 910 may transmit the lighting device identifier and information about whether the position of the lighting device 910 is registered to the terminal 920 together with the visible light communication data. In this case, the controller 1130 checks whether or not the position of the lighting device 910 is registered in the server 930 based on the information about whether or not the position of the lighting device 910 is registered, and performs the procedure of registering the position of the lighting device 910 depending on the result of the checking.

In yet another embodiment, the lighting device 910 may transmit a lighting device identifier to the terminal 920 together with the visible light communication data. In this case, the controller 1130 performs a procedure of registering the position of the lighting device 910 based on the lighting device identifier and the information about whether or not the pre-recognized position of the lighting device 910 is registered. To this end, the controller 1130 communicates with the server 930, and collects, in advance, the registered lighting device identifier and the information about whether or not the position of the visible light lighting device is registered.

The controller 1130 calculates the position information about the lighting device 910 based on the lighting device identifier and the current position information about the terminal 920 calculated by the position information calculator 1140. The controller 320 generates matching information by matching the lighting device identifier and the current position information about the terminal 920, and provides the matching information as position information about the lighting device 910.

The position information calculator 1140 calculates the current position information about the terminal 920 and provides the same to the controller 1130.

The position information calculator 1140 may include a GPS sensor to calculate current position information about the terminal 920.

In another embodiment, the position information calculator 1140 may include a motion sensor to calculate the current position information about the terminal 920. Here, the motion sensor is preferably an acceleration sensor or a gyro sensor, but is not limited thereto. For example, the motion sensor may be implemented by any sensor which is capable of calculating the motion information about the terminal 920.

The position information calculator 1140 may calculate the information about the current position of the terminal 920 based on the position information about at least one reference lighting device in a preset lighting area and the motion information about the terminal 920 with respect to the position of the reference lighting device collected by the motion sensor. To this end, the position information calculator 330 receives and stores the position information about at least one reference lighting device in the preset lighting area from the server 930. The conventional lighting device is preferably a lighting device positioned at an entrance and an exit of the preset lighting area, but is not limited thereto.

The display unit 1150 outputs an information providing screen for visible light communication data.

The communication unit 1160 includes a wireless communication module to perform wireless communication with an external device. The communication unit 1160 according to this embodiment transmits the position information about the lighting device 910 calculated by the controller 1130 to the lighting device 920 or the server 930. Finally, the sever 930 registers the position of the lighting device 910.

The power source unit 1170 provides necessary power for driving the terminal 920.

Figure 12:
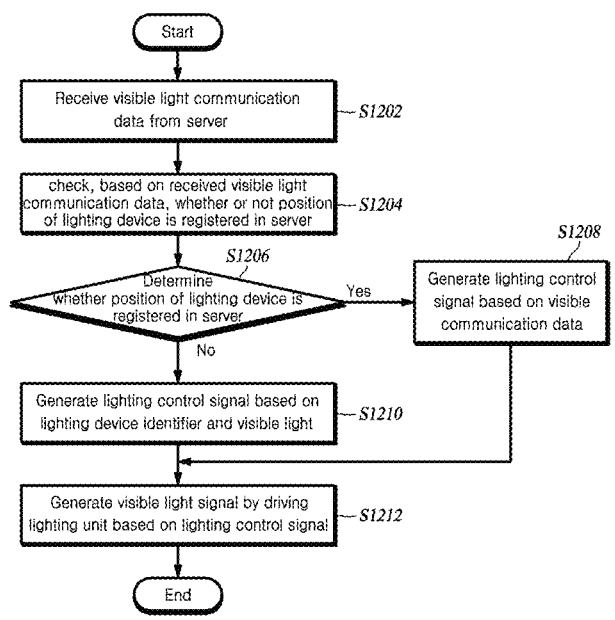
FIG. 12 is a flowchart illustrating a method for performing commissioning by a lighting device according to another embodiment of the present disclosure.

FIG. 12 is a flowchart illustrating a method for performing commissioning by a lighting device according to another embodiment of the present disclosure.

The lighting device 910 receives the visible light communication data from the server 930 using a communication module (S1202). The visible light communication data includes information about registration of the lighting device 910 in the server 930.

The lighting device 910 checks, based on the received visible light communication data, whether or not the position of the lighting device 910 is registered in the server 930 (S1204). The lighting device 910 checks whether or not the position of the lighting device 910 is registered in the server 930 based on the registration information about the lighting device 910 included in the visible light communication data.

The lighting device 910 determines whether the position of the lighting device 910 is registered in the server 930 according to the result of the checking (S1206).

If the position information about the lighting device 910 is registered in the server 930, a lighting control signal is generated based on the visible light communication data (S1208).

If the position information about the lighting device 910 is not registered in the server 930 as a result of the checking, the lighting device 910 generates a lighting control signal based on the lighting device identifier and the visible light communication data (S1210). The lighting device 910 may generate a lighting control signal, considering lighting type information in addition to the lighting device identifier and the visible light communication data.

The lighting device 910 generates a visible light signal by driving the lighting unit based on the lighting control signal (S1212).

Figure 13:
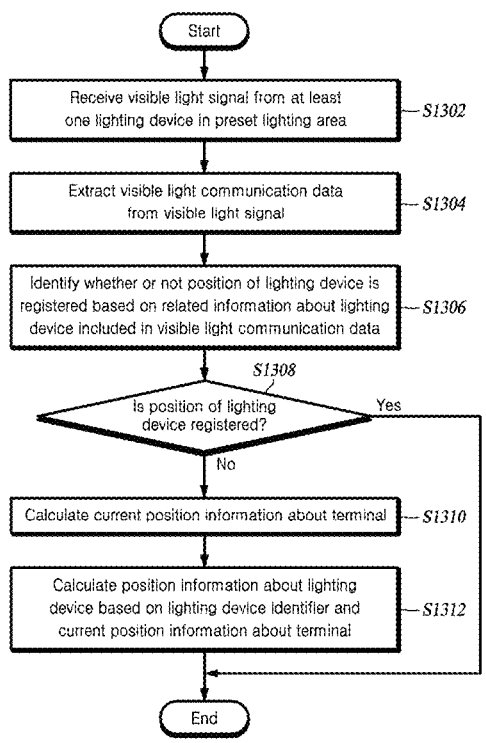
FIG. 13 is a flowchart illustrating a method for performing commissioning by a terminal according to another embodiment of the present disclosure.

FIG. 13 is a flowchart illustrating a method for performing commissioning by a terminal according to another embodiment of the present disclosure.

The terminal 920 receives a visible light signal from at least one lighting device 910 in a preset lighting area (S1302).

The terminal 920 extracts visible light communication data from the received visible light signal (S1304).

The terminal 920 identifies whether or not the position of the lighting device 910 is registered based on the related information about the lighting device 910 included in the extracted visible light communication data (S1306). If the related information about the lighting device 910 includes the lighting device identifier, the terminal 920 determines that the position of the lighting device 910 is registered in the server 930.

If the position of the lighting device 910 is not registered in the server 930, the terminal 920 calculates current position information about the terminal 920 (S1310). The terminal 920 may calculate the current position information about the terminal 920 using a GPS sensor or a motion sensor.

The terminal 920 calculates position information about the lighting device 910 based on the lighting device identifier and the current position information about the terminal 920 (S1312). The terminal 920 generates matching information by matching the lighting device identifier and the current position information about the terminal 920, and provides the matching information as the position information about the lighting device 910.

Figure 14:
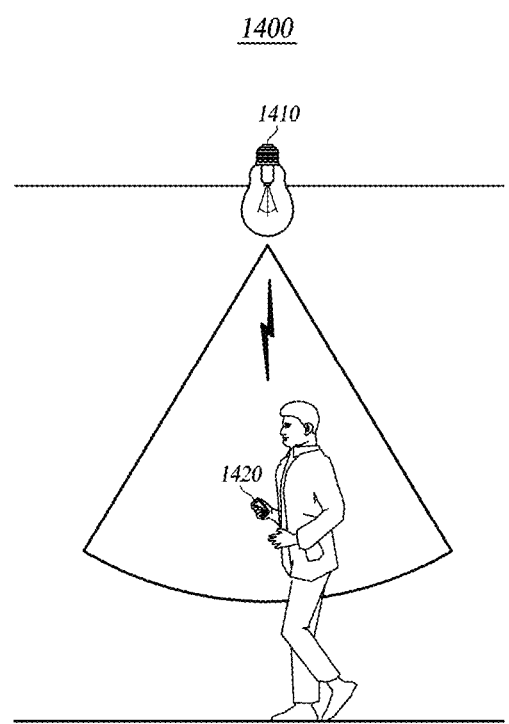
FIG. 14 is a diagram illustrating a visible light communication system according to yet another embodiment of the present disclosure.

FIG. 14 is a diagram illustrating a visible light communication system according to yet another embodiment of the present disclosure.

A visible light communication system 1400 includes a lighting device 1410 and a terminal 1420.

The lighting device 1410 is a device that transmits data to the terminal 1420 using visible light communication or wireless communication. The lighting device 1410 generates a visible light communication signal using a visible light communication module and transmits the same to the terminal. Visible light communication refers to a technology for transmitting information using light in the visible light wavelength range that is recognizable by the eyes. In this technique, turning on and off is repeated to present data to be transmitted to the terminal. The light is repeatedly turned on and off to express data to be transmitted to the terminal. Since the lighting device 1410 repeats turning on or off at a speed that the human optic nerve cannot recognize, it may transmit data while maintaining the function of lighting.

The lighting device 1410 may also include a wireless communication module, and may transmit and receive data to and from the terminal 1420 using wireless communication. Wireless communication refers to a communication technology for transmitting information to a remote place using radio waves without a connection by wires. Examples of this technology include Bluetooth, RFID (Radio Frequency Identification), IrDA (Infrared Data Association), UWB (Ultra-Wide Band), ZigBee, DLNA (Digital Living Network Alliance), WLAN (Wireless LAN), Wi-Fi, WiBro (Wireless broadband), WIMAX (World Interoperability for Microwave Access), HSDPA (High Speed Downlink Packet Access), and LTE/LTE-A (Long Term Evolution/LTE-Advanced). The lighting device 1410 may be implemented using a light emitting diode (LED), but is not limited thereto. The LED may be replaced with any device that emits visible light such as fluorescent light or visible light laser.

The lighting device 1410 generates a combined signal. An electrical signal corresponding to data to be transmitted using visible light communication (hereinafter referred to as "visible light communication electrical signal") is transmitted to the visible light communication module, and the visible light communication module transmits data to the terminal through visible light communication according to the visible light communication electrical signal. Similarly, an electrical signal corresponding to data to be transmitted using wireless communication (hereinafter referred to as "wireless communication electrical signal") is transmitted to the wireless communication module, and the wireless communication module transmits data to the terminal through wireless communication according to the wireless communication electrical signal. The combined signal refers to a signal containing a combination of a visible light communication electrical signal and a wireless communication electrical signal. The wireless communication electrical signal may be a pulse modulated signal, e.g., a signal subjected to pulse width modulation (PWM), pulse amplitude modulation (PAM), or pulse position modulation (PPM), but is not limited thereto. The wireless communication electrical signal may be a velocity-modulated signal or a phase-modulated signal. The wireless communication electrical signal presents attribute information about the light using the pulse width, the pulse amplitude, and the like. Hereinafter, for simplicity, it is assumed that the wireless communication electrical signal is a pulse-width modulated signal. After pairing is completed, the lighting device 1410 generates a combined signal including data to be transmitted, and transmits the data to the terminal 1420 using wireless communication or visible light communication. Since only one of the visible light communication electrical signal and the wireless communication electrical signal can be generated, the conventional lighting device has inconvenience as it is selectively operated as a light or a communication device. In addition, in order to simultaneously operate as a light and as a communication device, the conventional lighting device is required to include both a module for generating a visible light communication electrical signal and a module for generating a wireless communication electrical signal. In contrast, the lighting device 1410 according to an embodiment of the present disclosure generates a combined signal, and thus only needs to include a combined signal generation module rather than including all modules for generating the respective types of electrical signals. Further, since the combined signal including the respective electrical signals is transmitted to each communication module, and each communication module only needs to transmit data in accordance with the combined signal, there is no need to selectively operate the lighting device 1410 as a light or as a communication device.

For wireless communication with the terminal 1420, the lighting device 1410 attempts pairing. After being paired, the lighting device 1410 transmits and receives data using the wireless communication module. The lighting device 1410 transmits the lighting device identifier to the terminal 1420 through visible light communication, and pairing for wireless communication is established between the lighting device 1410 and the terminal 1420 as the lighting device receives wireless communication configuration information about the terminal 1420 from the terminal. The wireless communication configuration information about the terminal refers to information for identifying wireless communication employed by the terminal and includes a MAC address for wireless communication. After pairing is completed, the lighting device 1410 transmits and receives data to and from the terminal 1420 using the wireless communication module. The lighting device 1410 transmits, to the terminal 1420, a combined signal including the data to be transmitted, using the wireless communication module.

The terminal 1420 is a device that receives data transmitted from the lighting device 1410 through visible light communication or wireless communication and transmits data to the lighting device 1410 through wireless communication. The terminal 1420 has a built-in or external visible light receiving module, and receives a visible light communication signal from the lighting device 1410 using the visible light receiving module and converts the same into an electrical signal. The visible light receiving module may be implemented as a camera, a photodiode, or the like, but is not limited thereto. The visible light receiving module may be replaced with any module capable of receiving visible light.

The terminal 1420 receives the data transmitted through visible light communication or wireless communication according to the combined signal from the lighting device 1410 and extracts a desired signal therefrom. The terminal 1420 receives data transmitted through visible light communication according to the combined signal, using the visible light receiving module. The terminal 1420 extracts data of only the visible light communication electrical signal from the combined signal using a filter. In addition, the terminal 1420 receives data transmitted through wireless communication according to the combined signal, using a wireless communication module. The terminal 1420 extracts data of only the wireless communication signal from the combined signal, using a filter.

The terminal 1420 attempts pairing for wireless communication with the lighting device 1410, and transmits and receives data through wireless communication after the completion of pairing.

Figure 15:
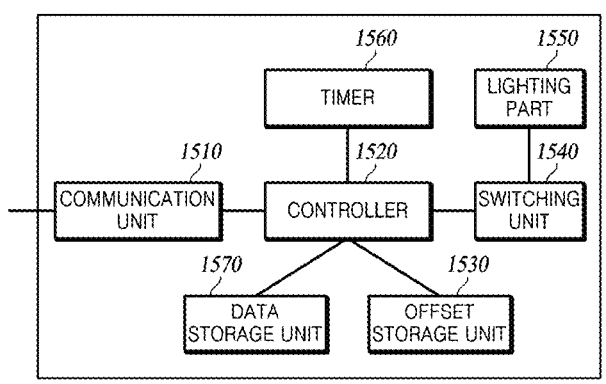
FIG. 15 is a block diagram of a lighting device according to yet another embodiment of the present disclosure.

FIG. 15 is a block diagram of a lighting device according to yet another embodiment of the present disclosure.

The lighting device 1410 includes a communication unit 1510, a controller 1520, an offset storage unit 1530, a switching unit 1540, a lighting part 1550, a timer 1560, and a data storage unit 1570.

The communication unit 1510 transmits data to the terminal 1420 according to the combined signal, and receives attribute information about the light or other data. The communication unit 1510 includes a wireless communication module and transmits and receives data and the like to and from the terminal 1420 through wireless communication using a wireless communication module. The communication unit 1510 receives the attribute information about the light from the terminal 1420 or an IoT device including a lighting sensor. The attribute information about the light is information on the brightness of the light, and conceptually includes luminosity, intensity of illumination, luminance, or dimming. Further, the communication unit 1510 may receive the wireless communication configuration information about the terminal 1420 from the terminal 1420.

The controller 1520 generates a combined signal. A data transmission interval and a data non-transmission interval are present in one period of the wireless communication electrical signal. The ratio of these intervals depends on the type of the wireless communication electrical signal and the standard established for each type. For example, when ZigBee communication is employed as wireless communication, there is an about 38 ms data non-transmission interval in one period. The controller 1520 combines the visible light communication electrical signal with the wireless communication electrical signal in the data non-transmission interval in one period of the wireless communication electrical signal.

Figure 16A:
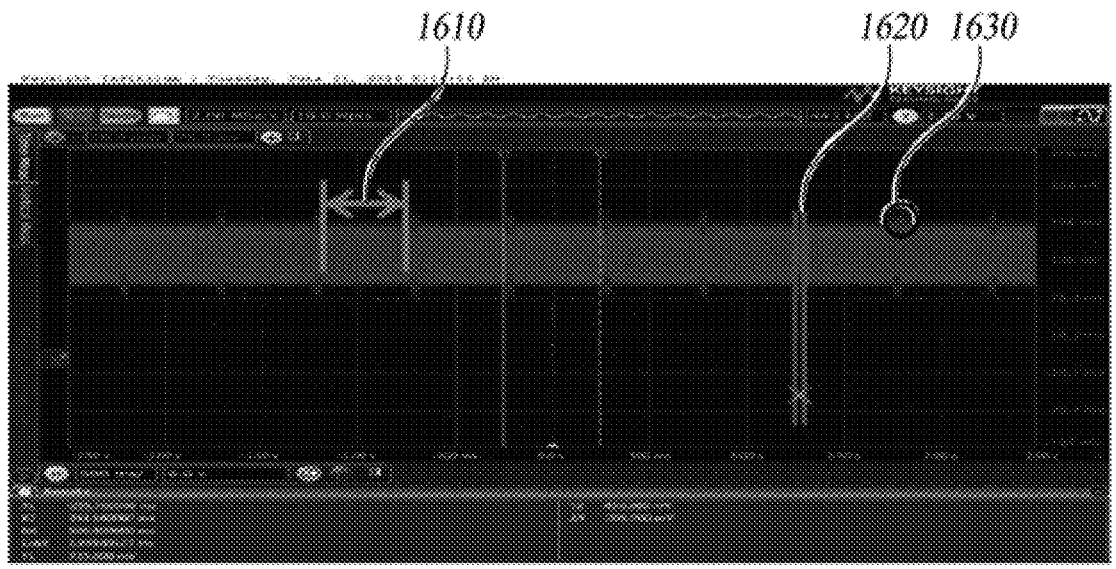
FIG. 16($a$) is a graph depicting a waveform of a signal radiated from a conventional lighting device.

However, the controller 1520 must consider the transfer speed of the wireless communication electrical signal and the visible light communication electrical signal in combining both electrical signals. The speed of a wireless communication electrical signal is generally lower than the speed of a visible light communication electrical signal, although it depends on the standard established for the wireless electrical signal. If the switching limit speed of the switching unit 1540 in the lighting device 1410 is higher than the speed of the visible light communication electrical signal, there is no problem even if the two electrical signals are simply combined. However, if the switching limit speed of the switching unit 1540 is lower than the speed of the visible light communication electrical signal, it is difficult to generate a combined signal. Since most lighting devices control the attributes of the lighting through wireless communication, they have only switching units sufficient to satisfy the speed of the wireless communication electrical signal. Therefore, if a lighting device having a typical switching unit merely combines the two signals, a problem as shown in FIG. 16(*a*) arises.

Figure 16B:
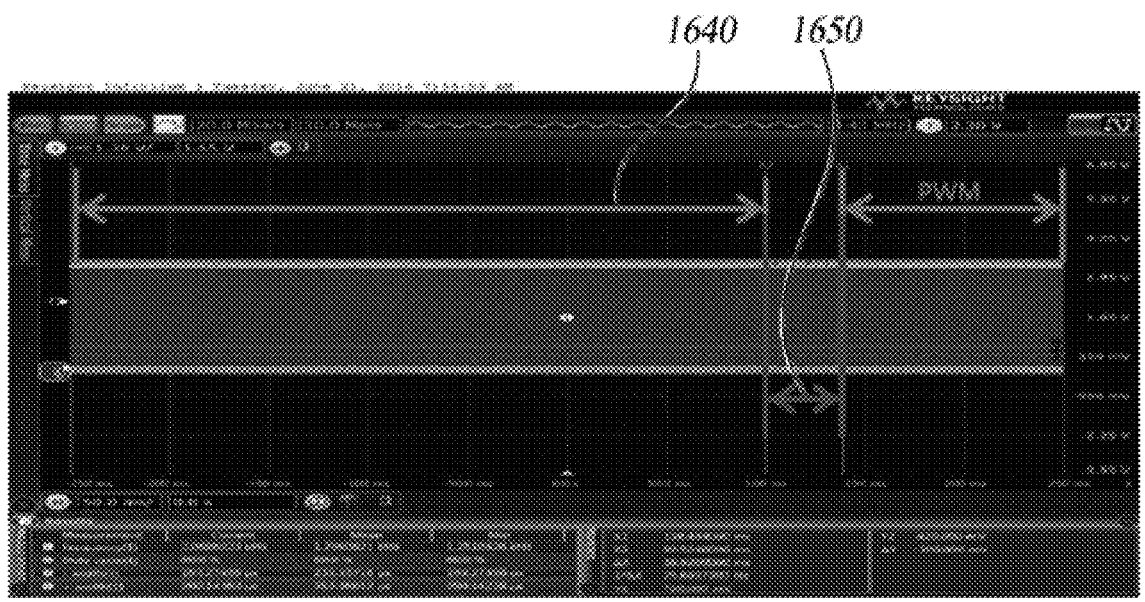

FIG. 16(*a*) is a graph depicting a waveform of a signal radiated from a conventional lighting device.

The graph shown in FIG. 16 (*a*) shows a waveform of an electrical signal generated when a conventional lighting device simply combines a wireless communication electrical signal and a visible light communication electrical signal. The combined electrical signal is divided into an interval 1610 in which a wireless communication electrical signal is present and an interval 1620 in which a visible light communication electrical signal is present, and the intervals appear sequentially. In the visible light communication electrical signal interval 1620, the amplitude of the visible light communication electrical signal before being subjected to combination is set to the same amplitude as the amplitude of the wireless communication electrical signal. However, when the switching limit speed of the switching unit does not satisfy the speed of the visible light communication electrical signal, noise 1630 is produced in the interval 1620 in which the visible light communication electrical signal is present, as shown in the figure. Accordingly, when the conventional lighting device adds data to the visible light communication electrical signal in the combined signal, there is a concern that the data to be transmitted may not be completely transmitted to the terminal.

In order to prevent such a problem while using a typical switching unit which cannot maintain the speed of visible light communication, a lighting device according to an embodiment of the present disclosure employs a velocity offset. The wireless communication electrical signal and the visible light communication electrical signal are not simply combined without any manipulation, but the switching speed of the wireless communication electrical signal is set to a specific velocity offset, and the visible light communication electrical signal is combined with a wireless communication electrical signal having the switching speed of the specific offset value. As the wireless communication electrical signal having the switching speed of the specific offset value is combined with the visible light communication electrical signal, no noise is generated in the visible light communication electrical signal. The controller 1520 determines the velocity offset value of the wireless communication electrical signal. The pulse width or amplitude of the wireless communication electrical signal varies with time depending on the attribute information about the light received by the communication unit 1510. For example, the width of a pulse of a wireless communication electrical signal varies with change in dimming of the light. To determine a velocity offset suitable for the wireless communication electrical signal that varies with time, the controller 1520 determines a velocity offset corresponding to the attribute information about the light reflected in the current wireless communication electrical signal among the velocity offsets stored in the offset storage unit 1530. For example, if dimming of the lighting is set to 30% and this setting is reflected in the wireless communication electrical signal, the controller 1520 may determine the velocity offset of the wireless communication electrical signal to be 250 kbit/s. If dimming of the lighting is set to 35% and this setting is reflected in the wireless communication electrical signal, the controller 1520 may determine the velocity offset of the wireless communication electrical signal as 300 kbit/s.

When generating a combined signal to be transmitted to the terminal 1420 for the first time, the controller 1520 generates a combined signal including a visible light communication electrical signal containing a lighting device identifier. The lighting device 1410 and the terminal 1420 are not paired for wireless communication before the lighting device 1410 transmits a combined signal to the terminal 1420. Accordingly, the controller 1520 generates a combined signal including the lighting device identifier in the visible light communication electrical signal to allow the terminal 1420 to receive the lighting device identifier for pairing. The terminal 1420 may receive the lighting device identifier included in the combined signal and identify and register the lighting device 1410 and may attempt pairing for wireless communication. For pairing, the terminal 1420 transmits the configuration information about the wireless communication used by the terminal to the lighting device 1410. When the communication unit 1510 receives the configuration information about the wireless communication, the controller 1520 performs a control operation to store the wireless communication configuration information in the data storage unit 1570.

The offset storage unit 1530 stores the velocity offset of the wireless communication electrical signal. As described above, if the wireless communication electrical signal varies according to the attribute information about the light, a velocity offset value suitable for the changed wireless communication electrical signal is required in order to prevent the noise from being generated in the visible light communication electrical signal. The offset storage unit 1530 stores a velocity offset of the wireless communication electrical signal corresponding to the attribute information about each light within a preset range. For example, suppose that the attribute information about lighting is dimming of the light, and the preset range is from 30% to 70% of dimming. The offset storage unit 1530 stores a velocity offset corresponding to each dimming value within the range of 30% to 70% of dimming of the lighting. The offset storage unit 1530 may store 250 kbit/s as the velocity offset when the dimming of the lighting is 30%, and 300 kbit/s as the velocity offset when the dimming of the lighting is 35%. The controller 1520 may generate a combined signal and may determine, from the offset storage unit 1530, a velocity offset corresponding to the attribute information about the light included in the wireless communication electrical signal in the combined signal.

The switching unit 1540 receives the combined signal and the velocity offset from the controller 1520, and performs switching so as to conform to the combined signal and the velocity offset. In switching the wireless communication electrical signal in the combined signal, the switching unit 1540 determines the switching speed in consideration of the velocity offset received from the controller 1520. Once the switching unit 1540 switches the combined signal in consideration of the velocity offset, a signal having a waveform as illustrated in FIG. 16(*b*) is output.

FIG. 16(*b*) is a graph depicting a waveform of a signal radiated from a lighting device according to yet another embodiment of the present disclosure.

The switching unit 1540 applies the velocity offset to the interval 1640 in which the wireless communication electrical signal is present in the combined signal. Accordingly, unlike the waveform shown in FIG. 16A, noise is not generated in the interval 1650 in which the visible light communication electrical signal is present in the combined signal.

The lighting part 1550 transmits data to the terminal according to switching of the switching unit 1540 using visible light communication. In transmitting the data according to the combined signal through visible light communication, the lighting part 1550 does not specify a terminal, but transmits the combined signal to all the terminals within the range reached by the visible light signal of the lighting part 1550.

The timer 1560 provides the controller 1520 with the timing of combining the wireless communication electrical signal with the visible light communication electrical signal. For the wireless communication electrical signal, the data transmission interval and the data non-transmission interval are usually set according to the standard. The combining timing is intended to allow the controller 1520 to accurately combine the visible light communication electrical signal in the determined interval. The timer 1560 provides the combining timing, and the controller 1520 combines the visible light communication electrical signal with the wireless communication electrical signal according to the received combining timing.

The data storage unit 1570 stores configuration information about the wireless communication. Upon receiving the combined signal, the terminal 1420 transmits the configuration information about the wireless communication used by the terminal 1420 to the communication unit 1510 to allow pairing. When the communication unit 1510 receives the configuration information about the wireless communication, the data storage unit 1570 stores the configuration information about the wireless communication used by the terminal 1420 under control of the controller 1520.

Figure 17:
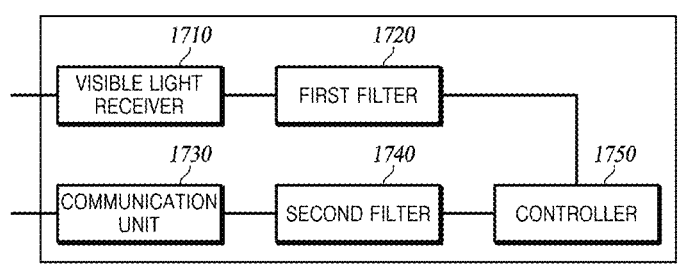
FIG. 17 is a block diagram of a terminal according to yet another embodiment of the present disclosure.

FIG. 17 is a block diagram of a terminal according to yet another embodiment of the present disclosure.

The terminal 1420 includes a visible light receiver 1710, a first filter 1720, a communication unit 1730, a second filter 1740, and a controller 1750.

The visible light receiver 1710 receives data corresponding to the combined signal from the lighting device 1410 using the visible light receiving module. After receiving the data transmitted through visible light communication according to the combined signal, the visible light receiver 1710 may convert the same into an electrical signal, and provide the electrical signal to the first filter 1720.

The first filter 1720 filters out data corresponding to the wireless communication electrical signal of the combined signal among the data received by the visible light receiver 1710. The first filter 1720 removes data corresponding to the wireless communication electrical signal because the necessary data of the received data is data corresponding to the visible light communication electrical signal. At this time, the first filter 1720 may remove the wireless communication electrical signal from the combined signal using a difference in speed between the visible light communication electrical signal and the wireless communication electrical signal, but embodiments are not limited thereto.

Using the wireless communication module, the communication unit 1730 receives data according to the combined signal from the lighting device 1410 or transmits a signal or data to the lighting device 1410.

The second filter 1740 filters out data corresponding to the visible light communication electrical signal of the combined signal among the data received by the communication unit 1730. The second filter 1740 removes the data corresponding to the visible light communication electrical signal from the combined signal because the necessary data among the received data is data corresponding to the wireless communication electrical signal.

The controller 1750 checks the data included in the combined signal that has been filtered, and controls the communication unit 1730 to transmit the data to the lighting device 1410. The controller 1750 receives an electrical signal including the lighting device identifier from the first filter 1720. By checking the lighting device identifier, the controller 1750 identifies the lighting device 1410 that transmitted the combined signal and registers the lighting device 1410. The controller 1750 controls a message for permitting joining the network used by the terminal 1420 to be transmitted to the registered lighting device 1410. The controller 1750 controls the communication unit 1730 to transmit a network join permission message to the lighting device 1410 in order to establish pairing between the terminal 1420 and the lighting device 1410. Thereafter, when the communication unit 1730 receives a network join message from the lighting device 1410, the controller 1750 controls the communication unit 1710 to transmit the configuration information about the wireless communication used by the terminal 1420 to the lighting device 1410 to allow pairing. As the communication unit 1730 transmits the wireless communication configuration information under control of the controller 1750, pairing between the terminal 1420 and the lighting device 1410 is completed.

The controller 1750 may control the communication unit 1730 to transmit the attribute information about the light to the lighting device 1410. The lighting device 1410 reflects the received attribute information about the light in the wireless communication signal.

Figure 18:
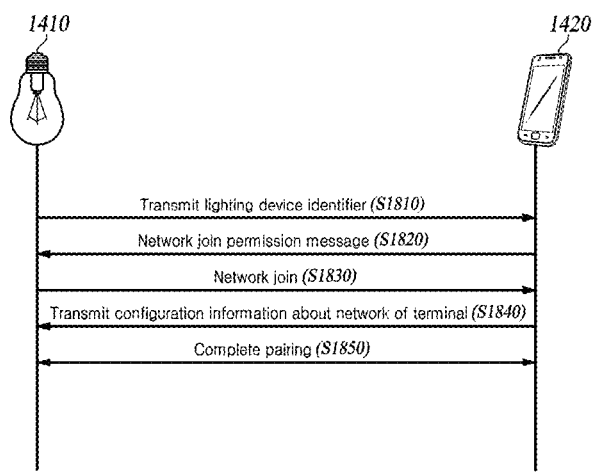
FIG. 18 is a timing chart illustrating a process of pairing a lighting device and a terminal according to yet another embodiment of the present disclosure.

FIG. 18 is a timing chart illustrating a process of pairing a lighting device and a terminal according to yet another embodiment of the present disclosure.

Before pairing is performed, the lighting device 1410 transmits a lighting device identifier to the terminal 1420 (S1810). The lighting device 1410 generates a combined signal by including the lighting device identifier in the visible light communication electrical signal, and transmits the combined signal to the terminal 1420.

The terminal 1420 transmits a network join permission message to the lighting device 1410 (S1820). More specifically, upon receiving data from the lighting device 1410 according to the combined signal including the lighting device identifier, the terminal 1420 registers the lighting device 1410 corresponding to the lighting device identifier. After registration, the terminal 1420 transmits a network join permission message to the lighting device 1410 to establish pairing between the terminal 1420 and the lighting device 1410.

Upon receiving the network join permission message from the terminal 1420, the lighting device 1410 transmits a network join message to the terminal 1420 (S1830).

Upon receiving the network join message from the lighting device 1410, the terminal 1420 transmits configuration information about the wireless communication of the terminal to the lighting device 1410 (S1840).

Pairing for wireless communication between the lighting device 1410 and the terminal 1420 is completed (S1850).

Figure 19:
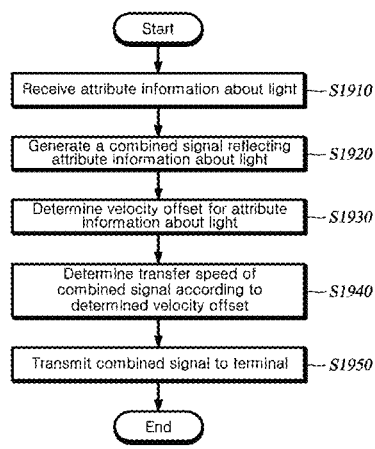
FIG. 19 is a flowchart illustrating an operation of a lighting device according to yet another embodiment of the present disclosure.

FIG. 19 is a flowchart illustrating an operation of a lighting device according to yet another embodiment of the present disclosure.

The communication unit 1510 of the lighting device 1410 receives the attribute information about the light from the terminal 1420 or an IoT device (not shown) including a lighting sensor (S1910).

The controller 1520 generates a combined signal reflecting the attribute information about the light (S1920). The wireless communication electrical signal reflects the attribute information about the light using pulse width, pulse amplitude, or the like, and adds data to be transmitted to the terminal 1420 after pairing is completed.

The controller 1520 determines a velocity offset for the attribute information about the light (S1930). The offset storage unit 1530 of the lighting device 1410 keeps a velocity offset for the attribute information about each light stored therein within a preset range. The controller 1520 determines a velocity offset corresponding to the received attribute information about the light from the offset storage unit 1530.

The controller 1520 determines the velocity offset to allow the switching unit 1540 to adjust the speed of the wireless communication electrical signal in the combined signal according to the velocity offset, and transmits the velocity offset along with the combined signal to the switching unit 240 (S1940). If the speed of the wireless communication electrical signal in the combined signal is adjusted according to the velocity offset, noise generation is prevented even if two electrical signals having different speeds are combined.

The lighting part 1550 or the communication unit 1510 transmits the combined signal to the terminal 1420 using visible light communication or wireless communication (S1950).

Steps are described to be sequentially performed in FIGS. 7, 8, 12, 13 and 19 as a mere example for describing the technical idea of some embodiments, although one of ordinary skill in the pertinent art would appreciate that various modifications, additions and substitutions are possible by performing the sequences shown in FIGS. 7, 8, 12, 13 and 19 in a different order or at least one of steps in parallel without departing from the idea and scope of the embodiments, and hence the examples shown in FIGS. 7, 8, 12, 13 and 19 are not limited to the chronological order.

The steps shown in FIGS. 7, 8, 12, 13 and 19 can be implemented as a computer program, and can be recorded on a non-transitory computer-readable medium. The computer-readable recording medium includes any type of recording device on which data that can be read by a computer system are recordable. Examples of the computer-readable recording medium include a magnetic storage medium (e.g., a floppy disk, a hard disk, a ROM, USB memory, etc.), an optically readable medium (e.g., a CD-ROM, DVD, Blue-ray, etc.) and carrier waves (e.g., transmission through the Internet). Further, an example computer-readable recording medium has computer-readable codes that can be stored and executed in a distributed mode in computer systems connected via a network.

As described above, according to one aspect of the embodiments, as a terminal transmits data to a light using wireless communication, the lighting device is allowed to collectively register the lighting device and the terminal, and thus the process of registering a visible light communication device with a server may be simplified.

According to another aspect of the embodiments, the visible light communication system selectively transmits an identifier of a lighting device during visible light communication and the position registration procedure for the lighting device is automatically performed based thereon. Accordingly, the position of the lighting device may be easily acquired, and the visible light communication system may be configured more efficiently.

According to another aspect of the embodiments, since the lighting device provides a visible light communication signal and a wireless communication signal by combining the same, a need to selectively perform the operation of transmitting the visible light communication signal and the operation of transmitting the wireless communication signal may be eliminated, and accordingly the corresponding flickering effect may be prevented.

Although exemplary embodiments of the present disclosure have been described for illustrative purposes, those skilled in the art will appreciate that various modifications, additions and substitutions are possible, without departing from the idea and scope of the claimed invention. Exemplary embodiments of the present disclosure have been described for the sake of brevity and clarity. Accordingly, one of ordinary skill would understand the scope of the disclosure is not limited by the explicitly described above embodiments but is inclusive of the claims and equivalents thereof.

What is claimed is:

1. A method performed by a lighting device communicatively connected to a service server, the method comprising:
   receiving a lighting search signal from the service server;
   in response to the lighting search signal, emitting visible light containing a terminal search signal to discover at least one terminal within an illumination coverage of the lighting device;
   receiving a terminal registration signal including a terminal identifier from said at least one terminal, wherein the terminal registration signal is created at said at least one terminal when said at least one terminal receives the visible light containing the terminal search signal; and
   transmitting a lighting registration signal to the service server, the lighting registration signal including the terminal identifier and a lighting identifier for identifying the lighting device, and thereby enabling the service server to register the lighting device together with said at least one terminal.

2. The method of claim 1, the method further comprising:
   receiving, from the service server, at least one terminal identifier for identifying terminal that has applied for a certain service; and
   when the terminal identifier included in the terminal registration signal matches said at least one terminal identifier received from the service server, transmitting the lighting registration signal to the service server.

3. The method of claim 1, the method further comprising:
   receiving, from the service server, at least one service identifier that identifies at least one certain service,
   wherein the terminal search signal includes said at least one service identifier to thereby discover at least one terminal which is located in the illumination coverage and has applied for said at least one certain service.

4. The method of claim 1, wherein the terminal registration signal further includes a service identifier, and wherein the method further comprises:
   receiving, from the service server, at least one service identifier that identifies at least one certain service and at least one terminal identifier that identifies at least one terminal has applied for said at least one certain service;
   comparing the service identifier included in the terminal registration signal with said at least one service identifier received from the service server; and
   when both the terminal identifier and the service identifier contained in the terminal registration signal match said at least one service identifier and said at least one terminal identifier, transmitting the lighting registration signal to the service server.

5. The method of claim 1, wherein the terminal search signal includes control information for coordinating the timing at which said at least one terminal transmits the terminal registration signal to the lighting device.

6. The method of claim 1, wherein the terminal registration signal is received from the terminal via a short-range wireless communication channel.

7. The method of claim 6, wherein the terminal search signal includes the lighting identifier for identifying the lighting device, and establishment of the short-range wireless communication channel is initiated by the terminal based on the lighting identifier.

8. The method of claim 1, wherein the terminal search signal further includes control information for coordinating the timing at which the terminal transmits the terminal registration signal to the lighting device, and wherein the method further comprises determining a timing to transmit the terminal registration signal to the lighting device.

9. A method performed by a terminal communicatively connected to a service server, the method comprising:
   receiving, from the service server, at least one service identifier that identifies at least one certain service provided by the service server;
   receiving visible light emitted from a lighting device communicatively connected to the service server, the visible light containing a terminal search signal which includes a service identifier assigned to the lighting device;

comparing the service identifier included in the terminal search signal with said at least one service identifier received from the service server; and when the service identifier included in the terminal search signal matches said at least one service identifier received from the service server, transmitting, to the lighting device, a terminal registration signal including a terminal identifier for identifying the terminal.

10. The method of claim 1, wherein the terminal registration signal is transmitted to the lighting device via a short-range wireless communication channel.

11. The method of claim 10, wherein the terminal search signal further includes a lighting identifier for identifying the lighting device, and establishment of the short-range wireless communication channel is initiated by the terminal based on the lighting identifier.

* * * * *